United States Patent Office 3,322,752
Patented May 30, 1967

3,322,752
2-(1-ADAMANTYL)-5-AMINO LOWER ALKYL BENZOTHIAZEPINS AND BENZOXAZEPINS
Jack Bernstein, New Brunswick, N.J., assignor, by mesne assignments, to E. R. Squibb & Sons, Inc., New York, N.Y., a corporation of Delaware
No Drawing. Filed June 15, 1965, Ser. No. 464,225
14 Claims. (Cl. 260—239.3)

This invention relates to new chemical compounds. More particularly, the invention relates to bases of the formula

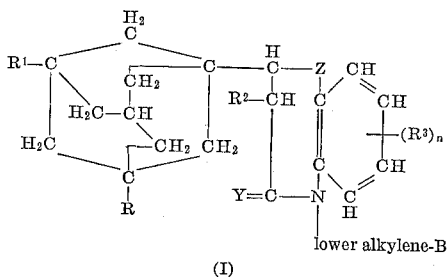

(I)

and to acid addition salts thereof.

In Formula I, the symbols have the following meanings: R and $R^1$ each represents hydrogen, halo, lower alkyl, phenyl, hydroxy and lower alkoxy; $R^2$ represents hydrogen and lower alkyl; $R^3$ represents hydrogen, lower alkyl, lower alkoxy, nitro, halo and halo-lower alkyl; Y represents

and oxygen (O=); Z represents oxa (—O—), thia (—S—), sulfinyl

and sulfonyl (—$SO_2$—); B represents a basic nitrogen containing radical of less than 14 carbon atoms; and $n$ represents an integer from 1 to 3.

The lower alkyl groups represented by the various symbols include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkylene groups are divalent radicals of the same type. The lower alkoxy groups contain alkyl groups of the same character attached to the oxygen.

Each of the four halogens is contemplated by the terms "halo" and "halo-lower alkyl," but in the case of the halogens themselves, chlorine and bromine are preferred while trifluoromethyl is the preferred haloalkyl group.

The basic nitrogen containing radicals symbolized by B may also be represented by the formula

wherein each $R^4$ represents hydrogen, lower alkyl, hydroxy-lower alkyl and phenyl-lower alkyl, forming such basic groups as amino, lower alkylamino, e.g., methylamino and ethylamino, di(lower alkyl)amino, e.g., dimethylamino, diethylamino and dipropylamino, (hydroxy-lower alkyl)amino, e.g., hydroxyethylamino, di(hydroxy-lower alkyl)amino, e.g., di(hydroxyethyl)amino, phenyl(lower alkyl)amino, e.g., benzylamino and phenethylamino, N-(lower alkyl)-N-phenyl(lower alkyl) amino,, e.g., N-methylbenzylamino, and the like.

In addition, the nitrogen may join with the groups represented by $R^4$ to form a 5 to 7 membered monocycle heterocyclic containing, if desired, an oxygen, sulfur or an additional nitrogen atom (not more than two hetero atoms altogether), that is, the two symbols $R^4$ represent together tetramethylene, pentamethylene, hexamethylene, oxapentamethylene, oxatetramethylene, azahexamethylene, azapentamethylene, azatetramethylene, thiapentamethylene or thiatetramethylene. The heterocyclic group may also be substituted by one or two groups represented by $R^3$.

Thus heterocyclic groups represented by B include, for example, piperidino, (lower alkyl)piperidino, e.g., methylpiperidino, di(lower alkyl)piperidino, e.g., dimethylpiperidino, (lower alkoxy)piperidino, e.g., methoxypiperidino, 2-, 3- or 4-piperidyl, 2-, 3- or 4-(lower alkylpiperidyl), e.g., 2-, 3- or 4-(N-methylpiperidyl), pyrrolidino, (lower alkyl)pyrrolidino, e.g., methylpyrrolidino, di(lower alkyl)pyrrolidino, e.g., dimethylpyrrolidino, (lower alkoxy)pyrrolidino, e.g., ethoxypyrrolidino, 2- or 3-pyrrolidyl, 2- or 3-(N-lower alkylpyrrolidyl), e.g., 2- or 3-(N-methylpyrrolidyl), morpholino, (lower alkyl-morpholino, e.g., N-methlymorpholino or 2-methylmorpholino, di(lower alkyl)morpholino, e.g., 2,3-dimethylmorpholino, (lower alkoxy)morpholino, e.g. ethoxymorpholino, thiamorpholino, (lower alkyl)thiamorpholino, e.g., N-methylthiamorpholino or 2-methylthiamorpholino, di(lower alkyl)thiamorpholino, e.g., 2,3-diethylthiamorpholino and 2,3-dimethylthiamorpholino and 2,3-dimethylthiamorpholino, (lower alkoxy) thiamorpholino, e.g., 2-methoxythiamorpholino, piperazino, (lower alkyl)piperazino, e.g., 4-methylpiperazino and 2-methylpiperazino, di(lower alkyl)piperazino, e.g., 2,3 - dimethylpiperazino, hydroxyloweralkylpiperazino, e.g., 4-(2-hydroxyethyl)piperazino, hexamethyleneimino and homopiperazino.

The adamentyl groups include unsubstituted adamantyl and simply substituted adamantyl, e.g., 3-R, 5-$R^1$-adamantyl, wherein R and $R^1$ each represents hydrogen, halogen, lower alkyl, phenyl, hydroxy and lower alkoxy as indicated above.

The preferred members of the class defined by Formula I are those wherein R, $R^1$, $R^2$ and $R^3$ are all hydrogen, B is di-(lower alkylamino), especially dimethylamino, the lower alkylene group has three carbon atoms, Y is oxygen and Z is sulfur.

The new compounds of this invention can be prepared by condensing a compound of the formula

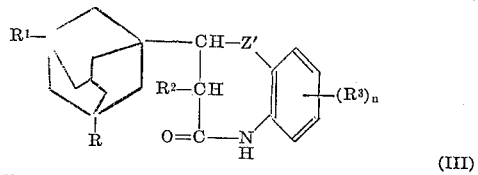

(III)

wherein $Z^1$ is oxa or thia and R, $R^1$, $R^2$, $R^3$ and $n$ have the previously defined meanings, with lower alkylene halide of the formula hal-lower alkylene-B          (iv)

wherein B has the previously defined meaning and hal represents a halogen, preferably chlorine or bromine. This reaction is preferably conducted by treating the reactants in the presence of a basic condensing agent, e.g., an alkali metal, an alkali metal amide such as sodamide, or an alkali metal hydroxide such as sodium or potassium hydroxide.

The resulting products may be converted to those compounds of Formula I wherein Y is $H_2$ by reduction, e.g., with an alkali metal hydride such as lithium aluminum hydride at about room temperature in an anhydrous organic solvent such as ether.

Those compounds of Formula I wherein Z is sulfinyl or sulfonyl may be produced by treating the compounds of Formula I in which Z is sulfur with an oxidizing agent such as hydrogen peroxide, potassium permanganate or a peracid such as peracetic acid.

The starting material of Formula III where Z' is sulfur can be prepared by reducing, e.g., catalytically with hydrogen in the presence of platinum, 2-nitrothiophenol to the corresponding 2-aminothiophenol of the formula

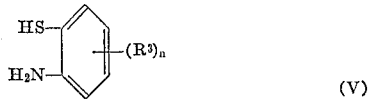

(V)

wherein $R^3$ and $n$ are as previously defined, and reacting the product of Formula V with a (3-R, 5-$R^1$-1-adamantyl)acrylic acid, e.g., by refluxing in toluene and dimethylformamide.

The (3-R, 5-$R^1$-1-adamantyl)acrylic acid is produced by treating a substituted or unsubstituted adamantane carboxylic acid with thionyl chloride and then with ethanol to obtain the ethyl ester. The latter is converted to the hydrazide by reaction with hydrazine, e.g., by refluxing in diethylene glycol. The hydrazide is then treated with toluenesulfonyl chloride, e.g., in pyridine at about 0° C., to yield the p-toluenesulfonyladamantane carboxylic acid hydrazine which is converted to the 1-adamantane carboxaldehyde, e.g., by heating the former with sodium carbonate in ethylene glycol. Treatment of the carboxaldehyde with malonic acid and α-picoline at elevated temperature yields the adamantylacrylic acid.

Suitable starting materials which may be utilized in preparing compounds of this invention include: 2-nitrobenzenethiol; halo-2-nitrobenzenethiols, such as 4-chloro-2-nitro-benzenethiol, 4-bromo-2-nitrobenzenethiol, 5-chloro-2-nitrobenzenethiol and 4,6-dichloro-2-nitrobenzenethiol; trifluoromethyl-2-nitrobenzenethiols, such as 4-trifluoromethyl-2-nitrobenzenethiol and 5-trifluoromethyl-2-nitrobenzenethiol; (lower alkyl)-2-nitrobenzenethiols, such as 5-methyl-2-nitrobenzenethiol, 4-ethyl-2-nitrobenzenethiol, 4,6-dimethyl-2-nitrobenzenethiol, and 3,4,5-trimethyl-2-nitrobenzenethiol; (lower alkoxy) - 2 - nitrobenzenethiols, such as 4-methoxy-2-nitrobenzenethiol, 5-ethoxy-2-nitrobenzenethiol, 4,6-diethoxy-2-nitrobenzenethiol and 3,4,5-trimethoxy-2-nitrobenzenethiol; 1-adamantanecarboxylic acid; 3-methyl-1-adamantanecarboxylic acid, 3-phenyl-1-adamantanecarboxylic acid, 3-hydroxy-1-adamantanecarboxylic acid, 3-methoxy-1-adamantanecarboxylic acid, 3-fluoro-, 3-chloro-, 3-bromo- and 3-iodo-1-adamantanecarboxylic acid, 3,5-dimethyl-1-adamantanecarboxylic acid and the like.

The starting material of Formula III, when $Z^1$ is oxygen may be prepared by condensing a 1-adamantanecarboxaldehyde with an appropriately substituted 2'-hydroxyacetophenone, ring-closing to the appropriately substituted 2,3-dihydro-1,4-benzopyrone and treatment with sodium azide to give the desired 2,3-dihydro-1,5-benzoxapin-4-one.

Suitable substituted 2'-hydroxyacetophenones include halo-2'-hydroxyacetophenones such as 3'-chloro-2'-hydroxyacetophenone, 4' - bromo-2'-hydroxyacetophenone, and 5'-fluoro-2'-hydroxy-acetophenone; lower alkyl-2'-hydroxyacetophenones such as 3'-methyl-2'-hydroxyacetophenone and 4'-methyl-2'-hydroxyacetophenone; alkoxy-2'-hydroxyacetophenones such as 3'-methoxy-2'-hydroxy-acetophenone, 5' - methoxy - 2' - hydroxyacetophenone and 4'-ethoxy-2'-hydroxyacetophenone; nitro-2'-hydroxyacetophenones such as 3'-nitro-2'-hydroxyacetophenone, 4'-nitro-2'-hydroxyacetophenone and 5'-nitro-2'-hydroxyacetophenone as well as 4'-methoxy-5'-bromo-2'-hydroxyacetophenone and 4' - methyl - 5' - bromo-2'-hydroxyacetophenone.

The bases of Formula I form acid-addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The new compounds of this invention have activity upon the central nervous system and are especially active as antidepressants and are useful in the alleviation of depressed states. They may be administered orally or parenteraly in the form of tablets, capsules, elixiars, injectables or the like by incorporating the appropriate dosage of the base of Formula I or a physiologically acceptable acid-addition salt thereof, e.g., about 25 to 500 mg., preferably about 50 to 250 mg., in a conventional vehicle according to accepted pharmaceutical practice.

The following examples are illustrative of the invention. All temperatures are on the centigrade scale.

*Example 1.—Preparation of 2-(adamantyl)-2,3-dihydro-5-(2-dimethylaminoethyl) - 1,5 - benzothiazepin-4-one hydrochloride*

(a) *Preparation of 1-adamantanecarboxylic acid, ethyl ester.*—Ten grams of 1-adamantanecarboxylic acid and 20 ml. of thionly chloride are heated under reflux for thirty minutes. The excess thionyl chloride is removed by distillation under reduced pressure. To remove the last traces of thionyl chloride, 10 ml. of anhydrous benzene is added to the residue and the benzene removed by distillation under reduced pressure. The residue is cooled in ice and 60 ml. of absolute ethanol added. The mixture is refluxed for one hour and then poured into 500 ml. of water. The organic layer is extracted with ether, the ether extracts combined and washed with aqueous sodium bicarbonate solution and water and then dried over anhydrous calcium chloride. The ether is then removed by distillation and the residue fractionally distilled under reduced pressure to yield the desired ester, B.P., 122–123° at 9 mm.

(b) *Preparation of 1-adamantanecarboxylic acid hydrazide.*—Ten grams of 1-adamantanecarboxylic acid ethyl ester and 20 ml. of 85% hydrazine hydrate in 100 ml. of diethylene glycol are heated under reflux for thirty hours. The cooled reaction mixture is diluted with 300 ml. of water and the precipitated solid is filtered. The hydrazide melts at 156–157° after recrystallization from aqueous methanol.

(c) *Preparation of $N^2$-(p-toluenesulfonyl)-1-adamantanecarboxylic acid hydrazide.*—Six grams of 1-adamantanecarboxylic acid hydrazide is dissolved in 60 ml. of pyridine and cooled in an ice bath. There is added, over the course of fifteen minutes, with vigorous stirring, six grams of p-toluenesulfonyl chloride. The reaction mixture is allowed to warm to room temperature, as the stirring is continued for an additional two hours and the mixture is then poured into 400 ml. of 2 N hydrochloric acid. The oil that precipitates, crystallizes rapidly and, after recrystallization from aqueous methanol, melts at 192°.

(d) *Preparation of 1-adamantanecarboxaldehyde.*— Eleven grams of $N^2$-(p-toluenesulfonyl)-1-adamantanecarboxylic acid hydrazide in 200 ml. of ethylene glycol is heated in an oil bath to 160–165°. Eleven grams of anhydrous sodium carbonate is added and a vigorous evolution of nitrogen takes place, which subsides after about five minutes. The reaction mixture is cooled and 200 ml. of water added. The mixture is extracted with ether and the ether extracts dried over anhydrous calcium chloride. The ether is removed by distillation and the residue distilled under high vacuum to yield the desired 1-adamantanecarboxaldehyde, boiling at 130–140° at 0.01 mm.

(e) *Preparation of 3-(1-adamantyl)acrylic acid.*—A mixture of 16.4 grams of 1-adamantanecarboxaldehyde, 10.4 grams of malonic acid and 9.3 grams of α-picoline is heated for four hours in a water bath at 70°, until the evolution of carbon dioxide ceases. The reaction mixture is then cooled and treated with 500 ml. of water to which is added 25 ml. of concentrated hydrochloric acid. The mixture is extracted with ether and the ether extracts then shaken with dilute aqueous sodium hydroxide. The sodium hydroxide solution is treated with decolorizing carbon, filtered and acidified with 20% sulfuric acid to precipitate the desired acid which is filtered and washed with water.

(f) *Preparation of 2-(1-adamantyl) - 2,3 - dihydro-1,5-benzothiazepin-4-one.*—A solution of 12.5 grams of 2-aminobenzenethiol and 20.6 grams of 3-(1-adamantyl)-acrylic acid in 100 ml. of toluene and 3 ml. of dimethylformamide is refluxed for seven hours, the water formed in the reaction being removed by azeotropic distillation with the toluene. The reaction mixture is then cooled, diluted with ether and treated with a solution of 10 ml. of concentrated hydrochloric acid in 30 ml. of water. The organic layer is separated, washed with water and dilute sodium bicarbonate solution and dried over anhydrous magnesium sulfate. The solvent is removed under reduced pressure to yield the crude thiazepinone, which is purified by crystallization from aqueous ethanol.

(g) *Preparation of 2-(1-adamantyl)-2,3-dihydro-5-(2-dimethylaminoethyl)-1,5-benzothiazepin-4-one hydrochloride.*—A slurry of 4.0 grams of sodamide and 33 grams of 2-(1-adamantyl)-2,3-dihydro-1,5-benzothiazepin-4-one in 400 ml. of anhydrous toluene is stirred at room temperature for thirty minutes. To this mixture there is then added a solution of 22 grams of dimethylaminoethyl bromide in 100 ml. of toluene. The reaction mixture is stirred for twenty-four hours and is then treated with 100 ml. of water and the organic phase separated. The aqueous layer is discarded and the organic phase is added to a cold solution of 13 grams of hydrochloric acid in 200 ml. of water. The aqueous phase is then treated with a solution of ten grams of sodium hydroxide in 50 ml. of water. The liberated base is extracted with ether, and the ether extracts dried with magnesium sulfate, and treated with decolorizing carbon. Concentration of the ether gives the crude base.

The base is dissolved in 200 ml. of anhydrous ether and treated with an equivalent amount of hydrogen chloride dissolved in ether. The precipitated hydrochloride is filtered and washed with anhydrous ether. The 2-(1-adamantyl)-2,3-dihydro-5-(2-dimethylaminoethyl) - 1,5-benzothiazepin-4-one hydrochloride may be recrystallized from an ethanol-ether mixture.

*Example 2.—Preparation of 2-(1-adamantyl)-2,3-dihydro-5-(dimethylaminoethyl)-1,5-benzoxazepin-4-(5H)-one hydrochloride*

(a) *Preparation of 3-(1-adamantyl)-2'-hydroxyacrylophenone.*—To a solution of 20 grams of 2'-hydroxyacetophenone and 28 grams of 1-adamantanecarboxaldehyde in 250 ml. of alcohol there is added 40 ml. of a 50% hydroxide solution. After several hours, the precipitated solid is filtered and suspended in dilute hydrochloric acid. The 3-(1-adamantyl)-2'-hydroxyacrylophenone is filtered and may be recrystallized from aqueous ethanol.

(b) *Preparation of 2-(1-adamantyl)-2,3-dihydro-1,4-benzopyrone.*—A solution of 54 grams of 3-(1-adamantyl)-2'-hydroxyacrylophenone in 150 ml. of warm ethanol is treated with a 750 ml. of 1.5% aqueous sodium hydroxide solution. The reaction mixture is allowed to stand for twelve hours and is then filtered. The 2-(1-adamantyl)-2,3-dihydro-1,4-benzopyrone is recrystallized from ethanol.

(c) *Preparation of 2-(1-adamantyl)-2,3-dihydro-1,5-benzoxazepin-4-(5H)-one.*—A suspension of 12.5 grams of 2-(1-adamantyl)-2,3-dihydro-1,4-benzopyrone and 4.0 grams of sodium azide in 33 ml. of acetic acid is stirred, cooled and treated with 6.6 ml. of concentrated sulfuric acid. The temperature of the reaction mixture is allowed to rise to 45° and maintained at 45–50° for about 45 minutes, until the evolution of nitrogen ceases. The mixture is cooled to 30° and poured into 350 ml. of 10% sodium bicarbonate solution. The mixture is extracted several times with ether and the combined extracts dried over anhydrous magnesium sulfate. The ether is removed by distillation and the residue triturated with hexane to yield the desired 2-(1-adamantyl)-2,3-dihydro-1,5-benzoxazepin-4-(5H)-one.

(d) *Preparation of 2-(1-adamantyl)-2,3-dihydro-5-(2-dimethylaminoethyl)-1,5-benzoxazepin-4-(5H)-one hydrochloride.*—Following the procedure of Example 1(g), but substituting an equivalent amount of the 2-(1-adamantyl)-2,3-dihydro-1,5-benzoxazepin-4-(5H)-one for the 2 - (1 - adamantyl)-2,3-dihydro-1,5-benzothiazepin-4-one there is obtained 2-(1-adamantyl)-2,3-dihydro-5-(2-dimethylaminoethyl)-1,5-benzoxazepin-4-(5H)-one hydrochloride.

*Example 3.—Preparation of 2-(1-adamantyl)-5-(2-dimethylaminoethyl) - 2,3,4,5 - tetrahydro-1,5-benzothiazepine hydrochloride*

A solution of 67 grams of 2-(1-adamantyl)-2,3-dihydro-5-(2 - dimethylaminoethyl)-1,5-benzothiazepin-4-one hydrochloride in 200 ml. of water is treated with a cold solution of 22 grams of potassium carbonate in 50 ml. of water. The liberated base is extracted with ether and dried over anhydrous magnesium sulfate and finally over anhydrous calcium sulfate. The ether solution is then added dropwise to a stirred slurry of 6.1 grams of lithium aluminum hydride in 500 ml. of anhydrous ether. The mixture is stirred for twenty-four hours at room temperature, cooled in an ice-bath and treated dropwise with 20 ml. of water followed by a solution of 5 grams of sodium hydroxide in 50 ml. of water. The mixture is stirred for two hours at room temperature. The mixture is filtered, dried over anhydrous magnesium sulfate and then concentrated to yield the crude product. This product is dissolved in absolute ethanol and treated with an equivalent amount of an alcoholic solution of hydrogen chloride. The resulting solution is diluted with anhydrous ether and the mixture cooled and filtered to yield the desired 2-(1-adamantyl) - 5 - (2-dimethylaminoethyl)-2,3,4,5-tetrahydro - 1,5-benzothiazepine hydrochloride. This hydrochloride may be purified by crystallization from acetonitrile or ethanol-ether.

*Example 4.—Preparation of 2-(1-adamantyl)-5-(2-dimethylaminoethyl)-2,3,4,5-tetrahydro - 1,5 - benzoxazepine hydrochloride*

Following the procedure of Example 3, but substituting an equivalent amount of 2-(1-adamantyl)-2,3-dihydro - 5-(2-dimethylaminoethyl)-1,5-benzoxazepin - 4 - (5H)-one hydrochloride for the 2-(1-adamantyl)-2,3-dihydro-5-(2-dimethylamino)-1,5-benzothiazepin-4-one hydrochloride, there is obtained 2-(1-adamantyl)-5-(2-dimethylaminoethyl)-2,3,4,5-tetrahydro-1,5 - benzoxazepine hydrochloride.

*Example 5.—Preparation of 2 - (1-adamantyl) - 2,3-dihydro-5-(2-dimethylaminoethyl)-1,5 - benzothiazepin - 4-one 1,1-dioxide hydrochloride*

An aqueous solution of 16.8 grams of 2-(1-adamantyl)-2,3-dihydro-5-(2-dimethylaminoethyl)-1,5 - benzothiazepin-4-one hydrochloride is made alkaline with sodium hydroxide solution and then extracted with ether. The ether extracts are combined, dried over magnesium sulfate and then concentrated to remove the solvent. The base so obtained is dissolved in 200 ml. of acetic acid and to this solution there is slowly added, with vigorous stirring, a solution of 12.7 grams of potassium permanganate in 200 ml. of water. The temperature is kept between 25° and 30° by external cooling, during this addition. After the addition is completed, an aqueous solution of sodium bisulfite is added to dissolve the precipitated manganese dioxide. After the addition of 400 ml. of water, the reaction mixture is made alkaline by the addition of potassium carbonate. The mixture is extracted several times with chloroform, and the combined chloroform extracts dried over anhydrous magnesium sulfate. Concentration of the solvent yields the crude base.

The base is dissolved in absolute ethanol and treated with an equivalent of ethanolic hydrogen chloride. Anhydrous ether is added and the precipitated solid filtered to yield the desired 2-(1-adamantyl)-2,3-dihydro-5-(2-dimethylaminoethyl)-1,5-benzothiazepin-4-one 1,1 - dioxide hydrochloride. This may be recrystallized from a mixture of ethanol and ether.

*Example 6.—Preparation of 2-(1-adamantyl)-2,3-dihydro-5-(2-dimethylaminoethyl)-1,5-benzothiazepin - 4 - one 1-oxide hydrochloride*

A solution of 11.5 grams of 2-(1-adamantyl)-2,3-dihydro-5-(2-dimethylaminoethyl) - 1,5 - benzothiazepin - 4-one (see Example 1(g)) in 50 ml. of acetic acid is treated with 3.5 grams of 30% hydrogen peroxide solution. The reaction mixture is allowed to remain at room temperature for twenty-four hours and is then diluted with 400 ml. of water. The mixture is made alkaline with potassium carbonate and is extracted with chloroform. The chloroform extract is washed with water, dried over anhydrous magnesium sulfate and concentrated under reduced pressure to yield 2-(1-adamantyl)-2,3-dihydro-5-(2-dimethylaminoethyl)-1,5-benzothiazepin - 4 - one 1 - oxide. A solution of this base is then treated with an ethereal solution of hydrogen chloride to yield the hydrochloric acid salt of 2 - (1 - adamantyl) - 2,3 - dihydro - 5 - (2 - dimethylaminoethyl)-1,5-benzothiazepin-4-one 1-oxide.

*Example 7*

*Example 7.—Preparation of 2 - (1 - adamantyl)-2,3-dihydro-5-(2morpholinoethyl)-1,5-benzothiazepin - 4-one hydrochloride*

Following the procedure of Example 1(g), but substituting an equivalent amount of 2-morpholinoethyl chloride for the dimethylaminoethyl bromide, there is obtained 2-(1-adamantyl)-2,3-dihydro-5-(2 - morpholinoethyl) - 1,5-benzothiazepin-4-one hydrochloride.

Similarly, by following the procedure of Example 1, but substituting the indicated basic bromide for the dimethylaminoethyl bromide in part (g), the designated 2-(1-adamantyl)-2,3-dihydro-5-R⁵-1,5-benzothiazepin - 4 - one is obtained as a monohydrochloride or dihydrochloride.

| Ex. | Reactant | Product: $R^5$ is— |
|---|---|---|
| 8 | Diethylaminoethyl bromide | Diethylaminoethyl. |
| 9 | Piperidinoethyl bromide | Piperidinoethyl. |
| 10 | 4-methylpiperazinoethyl bromide | 4-methylpiperazinoethyl. |
| 11 | 3-dimethylaminopropyl bromide | 3-dimethylaminopropyl. |

By following the procedure of Example 2, but substituting the indicated 1-admantanecarboxylic acid for the 1-adamantanecarboxylic acid in part (a), the designated 2-adamantyl-2,3 - dihydro-5 - (dimethylaminoethyl) - 1,5-benzothiazepin-4-one hydrochloride is obtained.

| Ex. | Reactant | Product |
|---|---|---|
| 12 | 3-methyl-1-adamantanecarboxylic acid | R=methyl. |
| 13 | 3-methoxy-1-adamantanecarboxylic acid | R=methoxy. |
| 14 | 3-bromo-1-adamantanecarboxylic acid | R=bromo. |
| 15 | 3,5-dimethyl-1-adamantanecarboxylic acid | R=methyl. $R^1$=methyl. |

By following the procedure of Example 1, but substituting the indicated 2-aminobenzenethiol for the 2-aminobenzenethiol in part (f), the designated substituted 2-(1-adamantyl)-2,3-dihydro-1,5-benzothiazepin-4 - one is obtained.

| Ex. | Reactant | Product |
|---|---|---|
| 16 | 4-trifluoromethyl-2-aminobenzenethiol | $R^3$=7-trifluoromethyl. |
| 17 | 5-chloro-2-aminobenzenethiol | $R^3$=8-chloro. |
| 18 | 5-methyl-2-aminobenzenethiol | $R^3$=8-methyl. |
| 19 | 4,6-dimethyl-2-aminobenzenethiol | $R^3$=7,9-dimethyl. |

By following the procedure of Example 2, but substituting the indicated 2'-hydroxyacetophenone for 2' - hydroxyacetophenone in part (a), the designated substituted 2-(1-adamantyl)-2,3-dihydro-1,5-benzoxazepin-4 - one is obtained.

| Ex. | Reactant | Substituted Benzoxazepinone |
|---|---|---|
| 20 | 4'-bromo-2'-hydroxyacetophenone | $R^3$=8-bromo. |
| 21 | 5'-methoxy-2'-hydroxyacetophenone | $R^3$=7-methoxy. |
| 22 | 4'-methoxy-5'-bromo-2'-hydroxyacetophenone | $R^3$=8-methoxy-2-bromo. |

*Example 23.—Preparation of 2-(1-adamantyl)-3-methyl-2,3-dihydro-5-(2-dimethylaminoethyl) - 1, 5 - benzothiazepin-4-one hydrochloride*

(a) *Preparation of 3-(1-adamantyl)-2 - methylacrylic acid.*—A mixture of 32.8 grams of 1-adamantanecarboxaldehyde, 32 grams of propionic anhydride and 20 grams of fused sodium acetate is heated with occasional shaking for thirty hours in an oil bath at 130–135°. The warm mixture is poured into about 500 ml. of water, stirred thoroughly and neutralized by the addition of sodium carbonate solution. The unchanged 1-adamantanecarboxaldehyde is extracted with ether and the aqueous solution is cooled and neutralized with hydrochloric acid. The precipitated 3-(1-adamantyl)-2-methylacrylic acid is recovered by filtration.

(b) *Preparation of 2-(1 - adamantyl)-3 - methyl-2,3-dihydro - 1,5 - benzothiazepin-4-one.*—A mixture of 25 grams of 2-aminobenzenethiol and 44 grams of 3-(1-adamantyl)-2-methylacrylic acid are heated in an oil bath at 200–210° for two hours. The cooled reaction mixture is triturated thoroughly with dilute sodium carbonate solution and is filtered. The solid is washed thoroughly with water to give the desired 2-(1-adamantyl)-3-methyl-2,3-dihydro-1,5-benzothiazepin-4-one.

(c) *Preparation of 2-(1 - adamantyl)-3-methyl-2,3-dihydro - 5 - (2-dimethylaminoethyl)-1,5-benzothiazepin-4-one hydrochloride.*—Following the procedure of Example 1(g), but substituting an equivalent amount of the 2-(1-adamantyl)-3 - methyl-2,3-dihydro-1,5-benzothiazepin-4-one for the 2 - (1-adamantyl)-2,3 - dihydro-1,5-benzothiazepin - 4 - one, there is obtained 2-(1 - adamantyl)-3-methyl - 2,3 - dihydro-5-(2-dimethylaminoethyl)-1,5-benzothiazepin-4-one hydrochloride.

What is claimed is:

1. A compound selected from the group consisting of bases of the formula

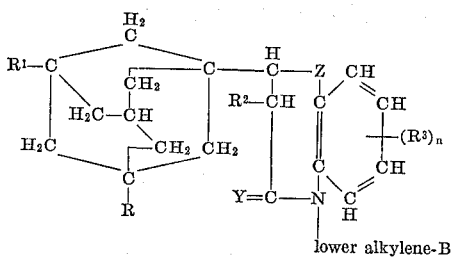

wherein R and R¹ each is a member of the group consisting of hydrogen, halo, lower alkyl, phenyl, hydroxy and lower alkoxy, R² is a member of the group consisting of hydrogen and lower alkyl, R³ is a member of the group consisting of hydrogen, lower alkyl, lower alkoxy, nitro, halo and halo-lower alkyl, Y is a member of the group consisting of $H_2$ and oxygen, Z is a member of the group consisting of oxa, thia, sulfinyl and sulfonyl, B is a basic nitrogen containing radical of less than fourteen carbon atoms of the group consisting of amino, lower alkylamino, di(lower alkyl)amino, (hydroxy-lower alkyl)amino, di(hydroxy-lower alkyl)amino, phenyl(lower alkyl)amino, N-(lower alkyl)-N-phenyl(lower alkyl)amino, piperadino, (lower alkyl)piperadino, di(lower alkyl)piperadino, (lower alkoxy)piperadino, pyrrolidino, (lower alkyl)pyrrolidino, di(lower alkyl)pyrrolidino, (lower alkoxy)pyrrolidino, morpholino, (lower alkyl)morpholino, di(lower alkyl)morpholino, (lower alkoxy)morpholino, thiamorpholino, (lower alkyl)thiamorpoholino, di(lower alkyl)thiamorpholino, (lower alkoxy)thiamorpholino, piperazino, (lower alkyl)piperazino, di(lower alkyl)piperazino, hydroxy-lower alkylpiperazino, hexamethyleneimino and homopiperazino and $n$ is an integer from one to three, and acid-addition salts of said bases.

2. 2-(1 - adamantyl)-2,3 - dihydro-5-(di-lower alkylamino-lower alkyl)-1,5-benzoxazepin-4-(5H)-one.

3. 2-(1 - adamantyl)-5-(di-lower alkylamino-lower alkyl)-2,3,4,5-tetrahydro-1,5-benzothiazepine.

4. 2-(1 - adamantyl)-5-(di-lower alkylamino-lower alkyl)-2,3,4,5-tetrahydro-1,5-benzoxazepine.

5. 2-1(1 - adamantyl)-2,3 - dihydro-5 - (di-lower alkylamino-lower alkyl)-1,5-benzothiazepin-4-one 1,1-dioxide.

6. 2-(1 - adamantyl)-2,3 - dihydro-5-(di-lower alkylamino-lower alkyl)-1,5-benzothiazepin-4-one 1-oxide.

7. 2-(1 - adamantyl)-3-lower alkyl-2,3-dihydro-5-(di-lower alkylamino-lower alkyl)-1,5-benzothiazepin-4-one.

8. 2-(1 - adamantyl)-2,3-dihydro-5-(2-dimethylaminoethyl)-1,5-benzothiazepin-4-one.

9. 2-(1 - adamantyl)-2,3-dihydro-5-(2-dimethylaminoethyl)-1,5-benzothiazepin-4-one hydrohalide.

10. 2-(1 - adamantyl)-2,3-dihydro-5-(2-dimethylaminoethyl)-1,5-benzoxazepin-4-(5H)-one.

11. 2-(1 - adamantyl)-5-(2 - dimethylaminoethyl)-2,3,4,5-tetrahydro-1,5-benzothiazepine.

12. 2-(1 - adamantyl)-5 - (2-dimethylaminoethyl)-2,3,4,5-tetrahydro-1,5-benzoxazepine.

13. 2-(1 - adamantyl)-2,3-dihydro-5-(2-dimethylaminoethyl)-1,5-benzothiazepin-4-one 1,1-dioxide.

14. 2-(1 - adamantyl)-3-methyl-2,3-dihydro-1,5-benzothiazepin-4-one.

No references cited.

WALTER A. MODANCE, *Primary Examiner.*

JOHN D. RANDOLPH, *Examiner.*

R. T. BOND, *Assistant Examiner.*